July 21, 1931. W. D. LA MONT 1,815,439
STEAM GENERATOR OR THE LIKE
Filed Jan. 4, 1926 11 Sheets-Sheet 2
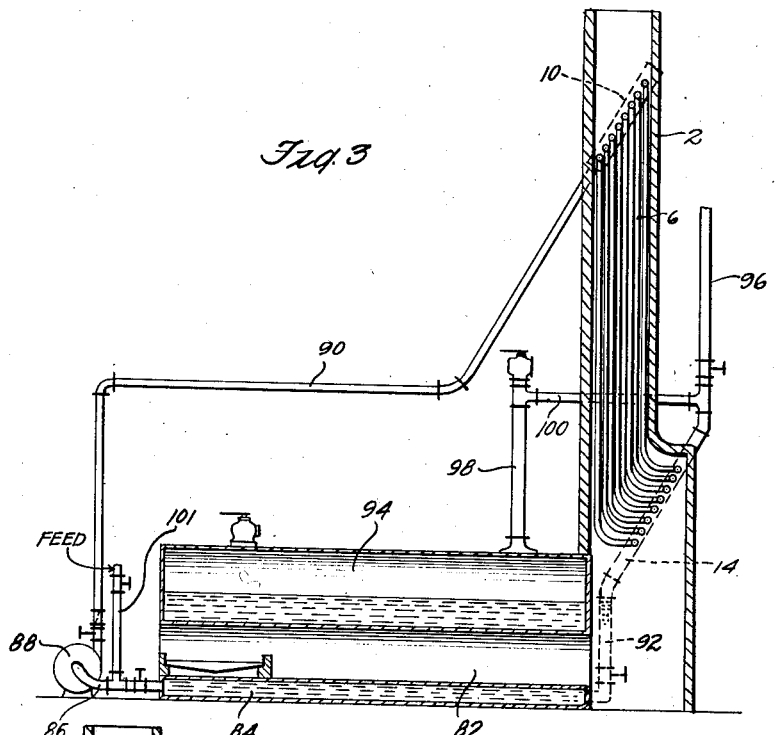
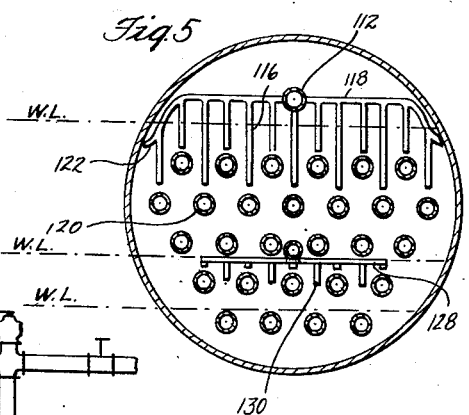
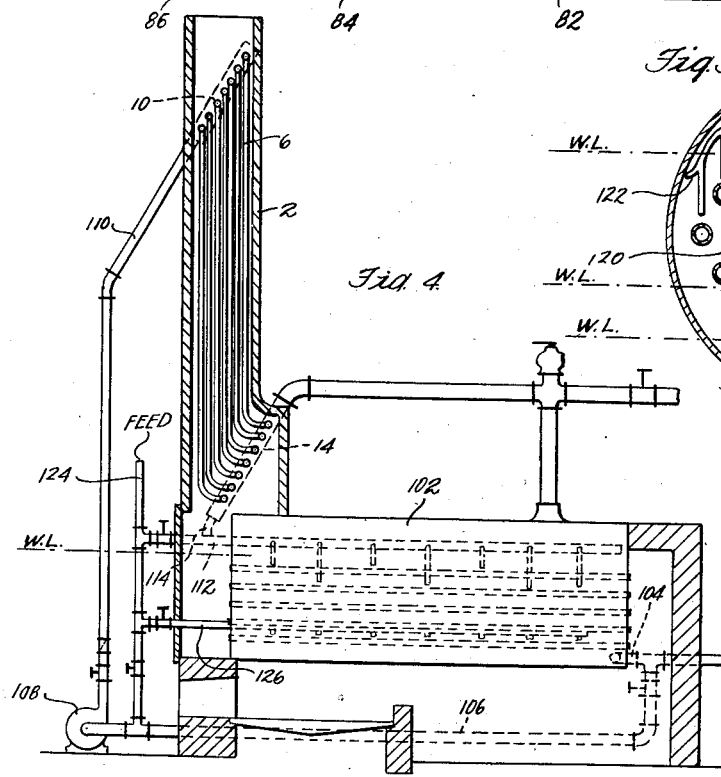
INVENTOR
WALTER DOUGLAS LAMONT
BY Newell + Spencer
ATTORNEYS

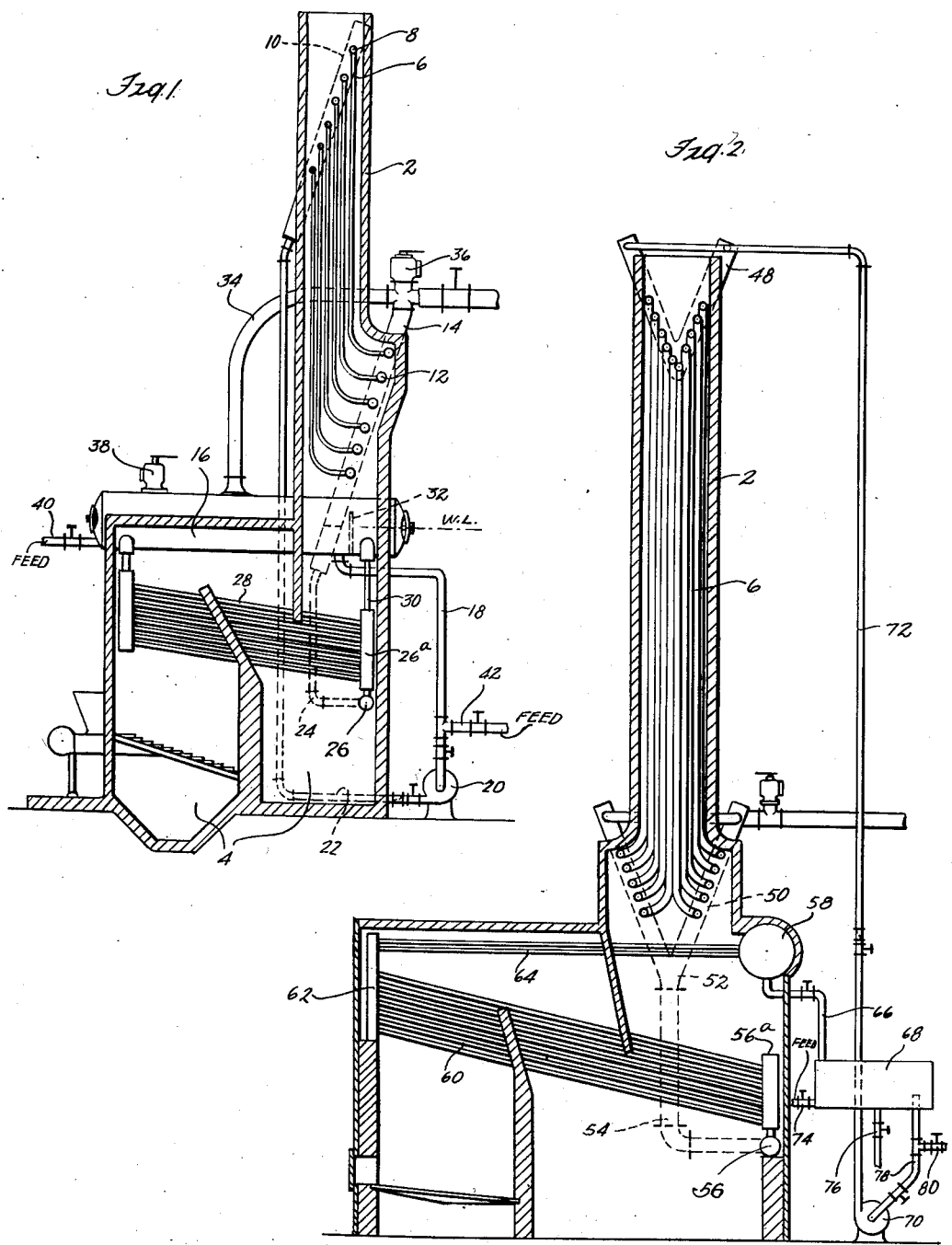

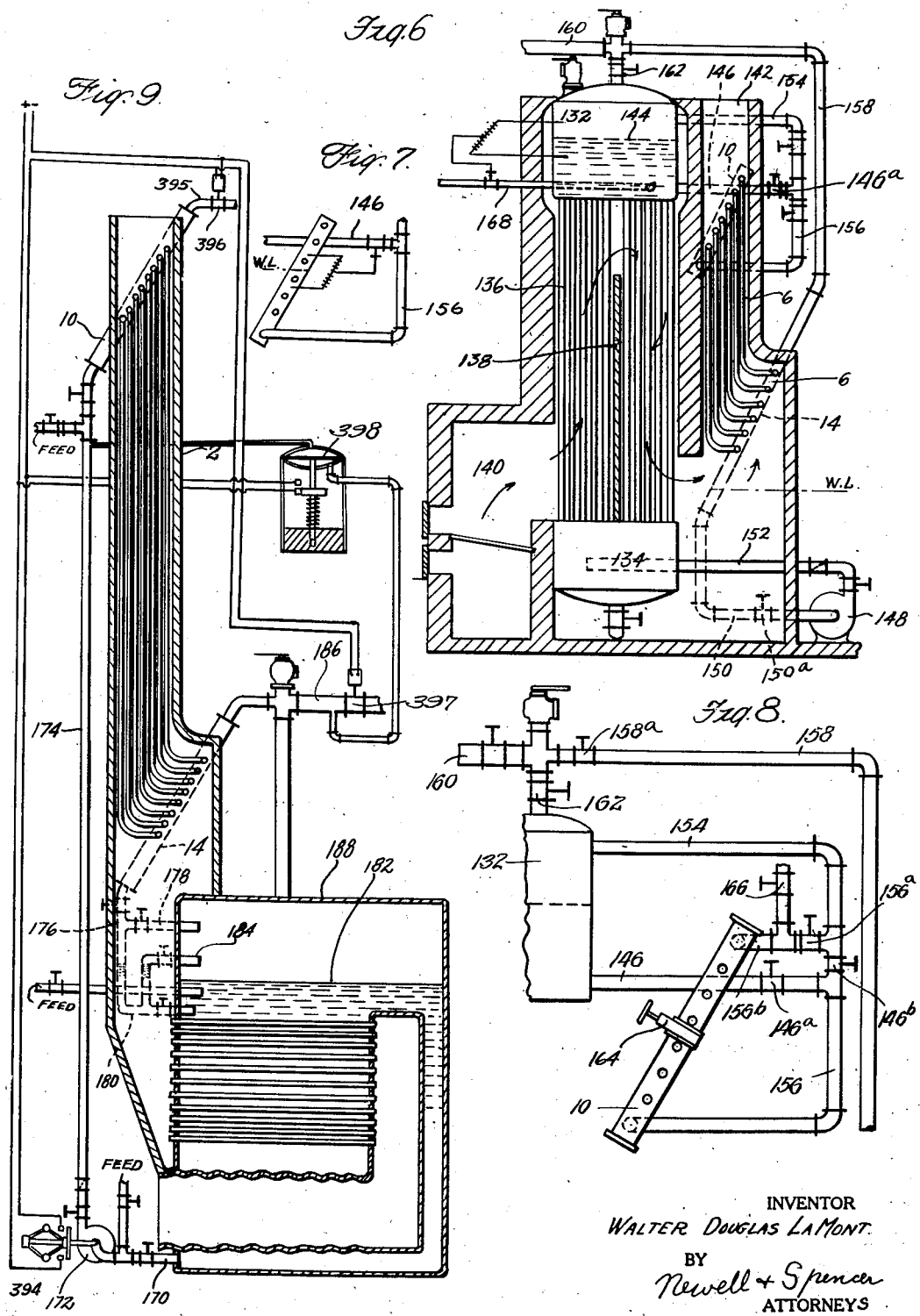

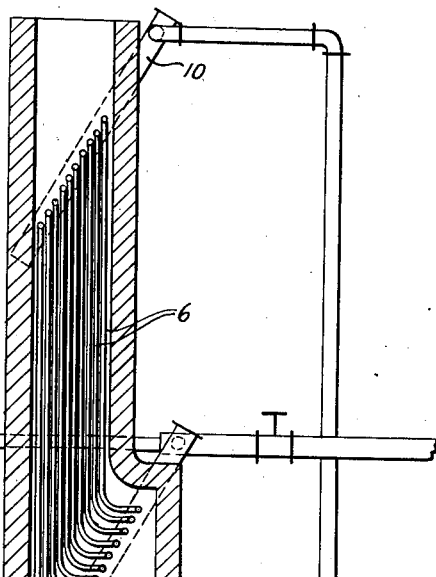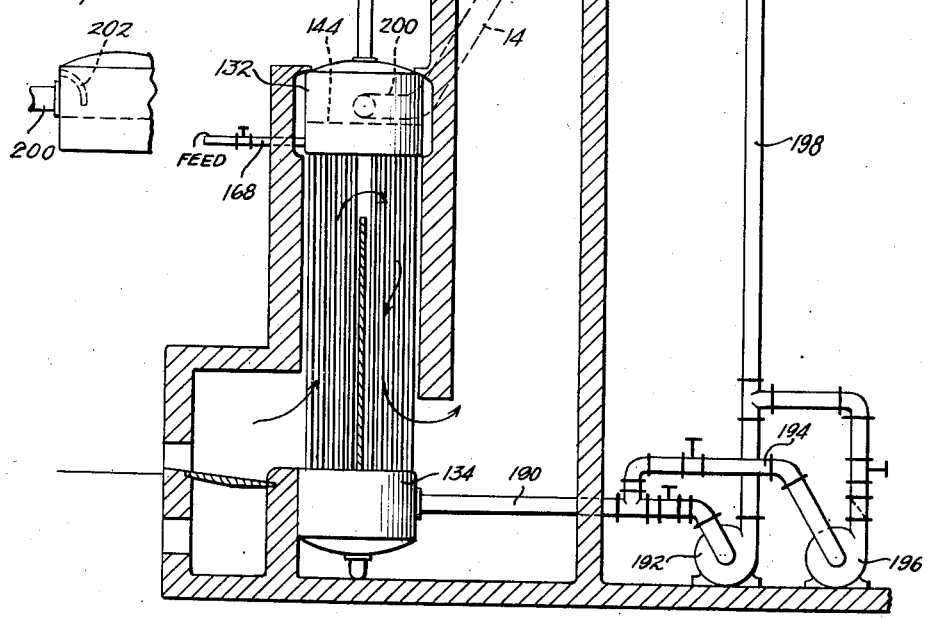

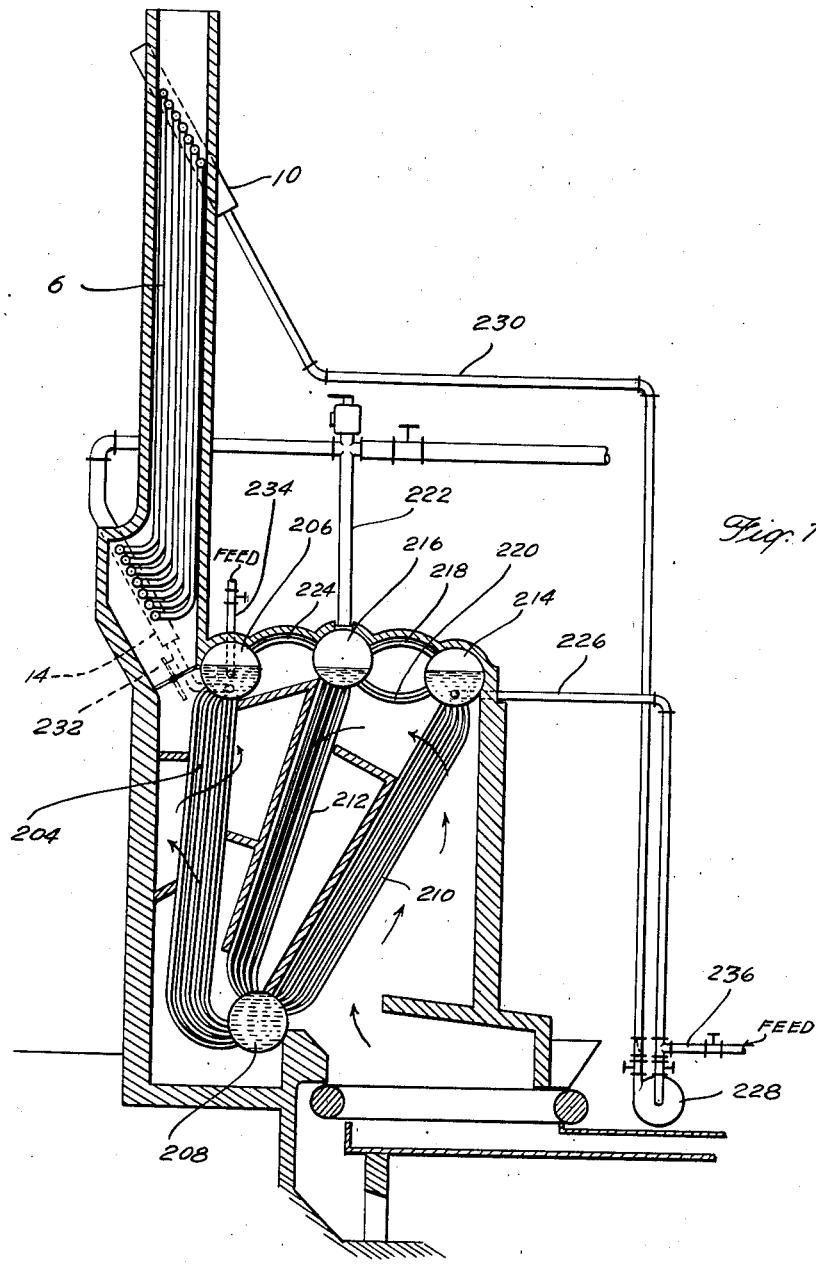

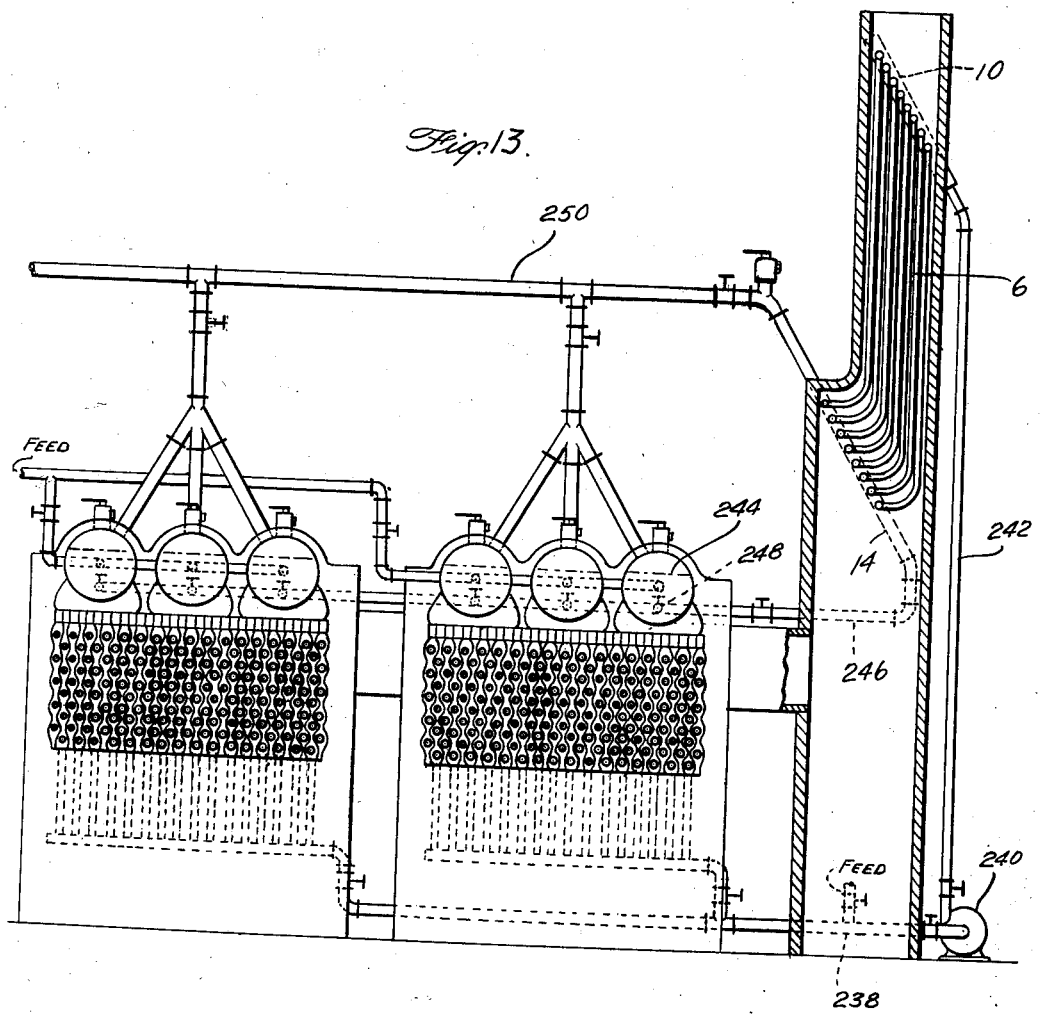

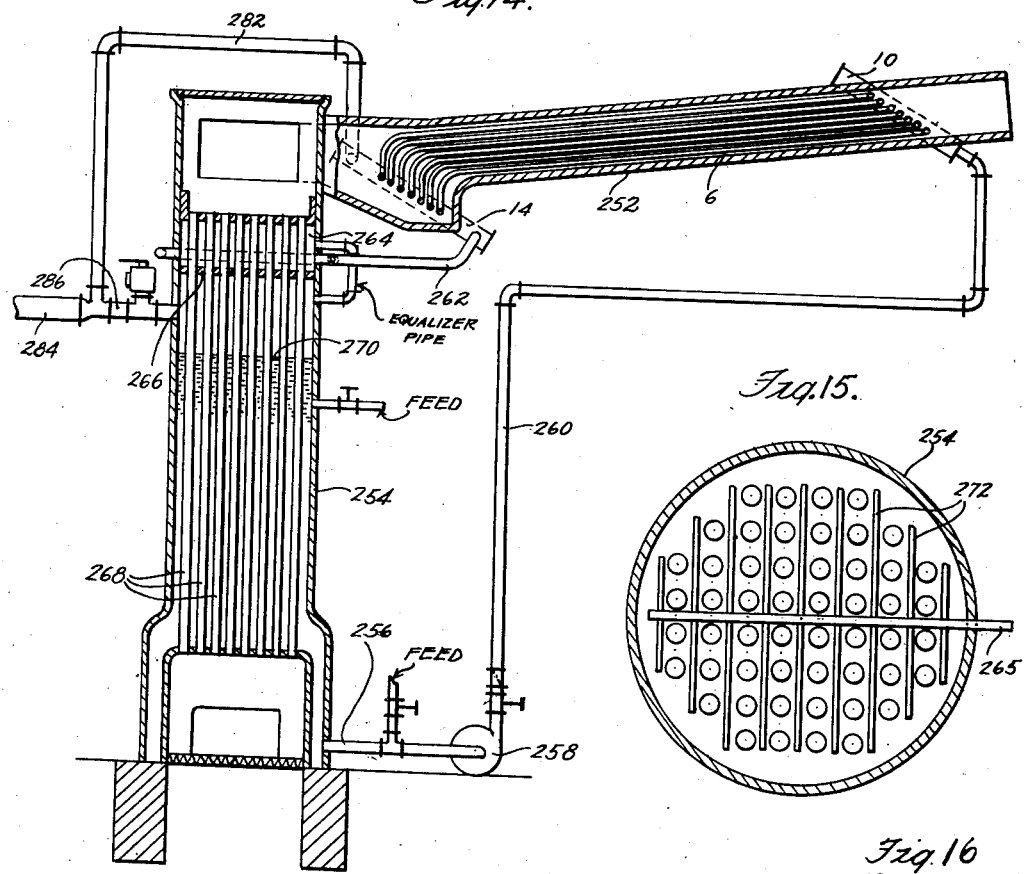

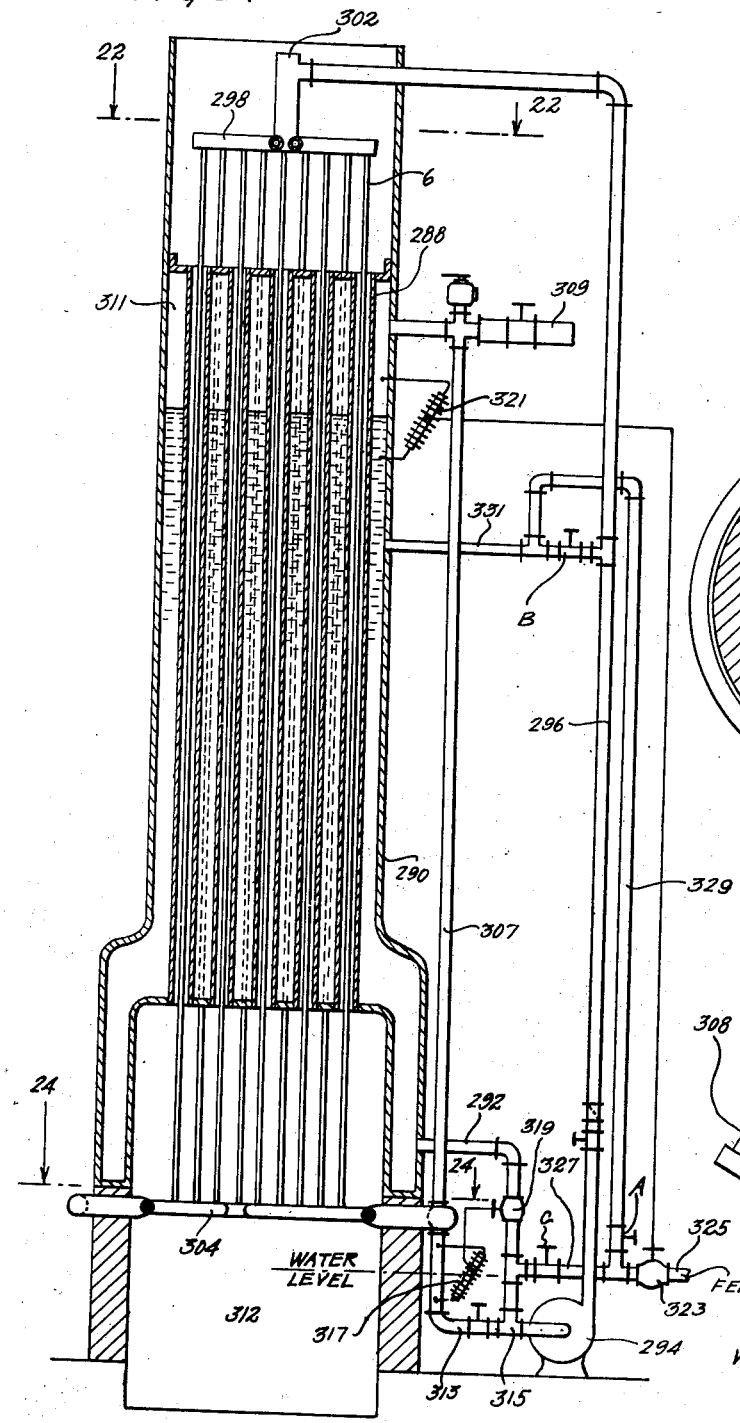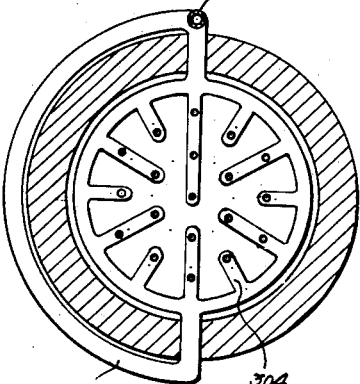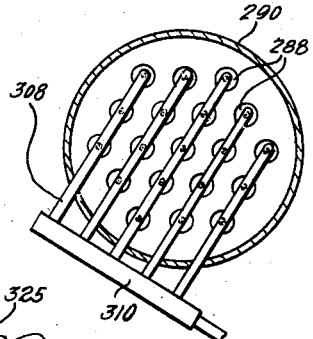

July 21, 1931.  W. D. LA MONT  1,815,439
STEAM GENERATOR OR THE LIKE
Filed Jan. 4, 1926  11 Sheets-Sheet 9
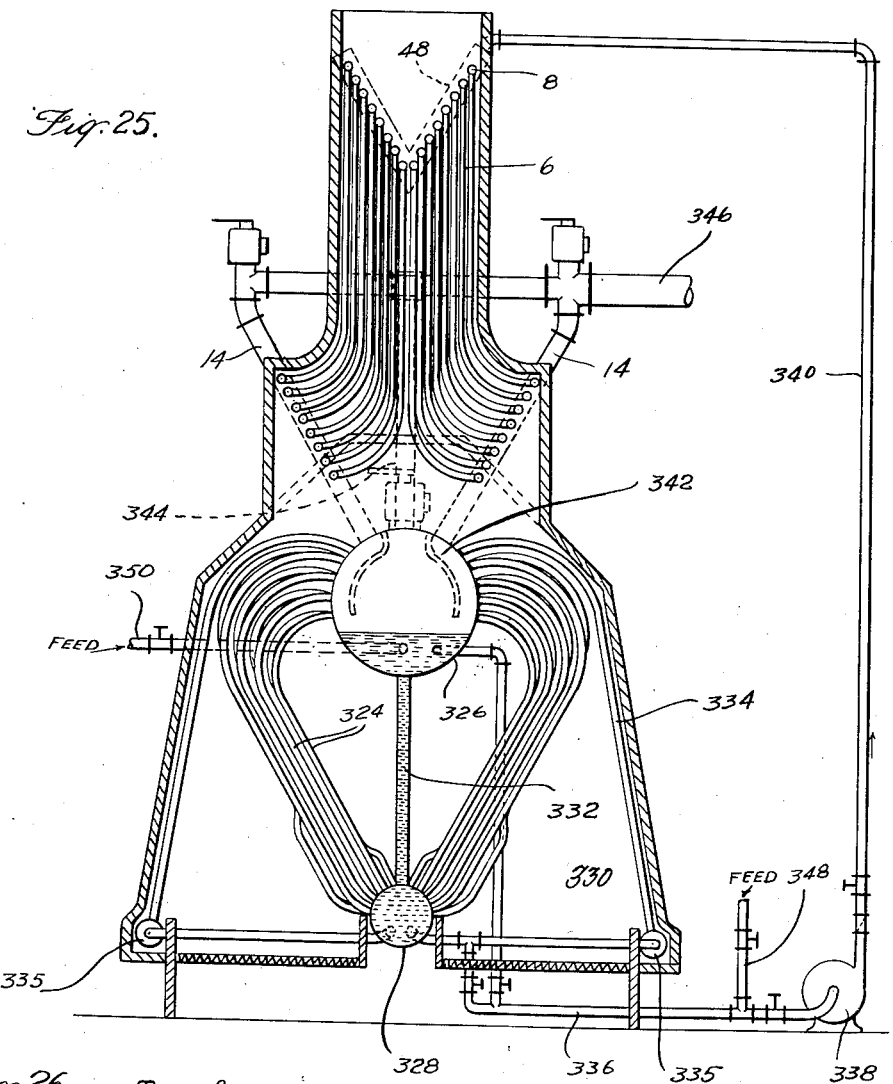
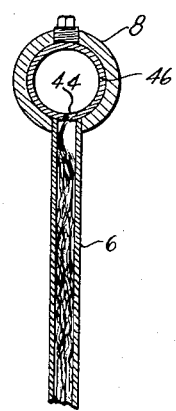
INVENTOR
WALTER DOUGLAS LAMONT
BY
Newell & Spencer
ATTORNEYS

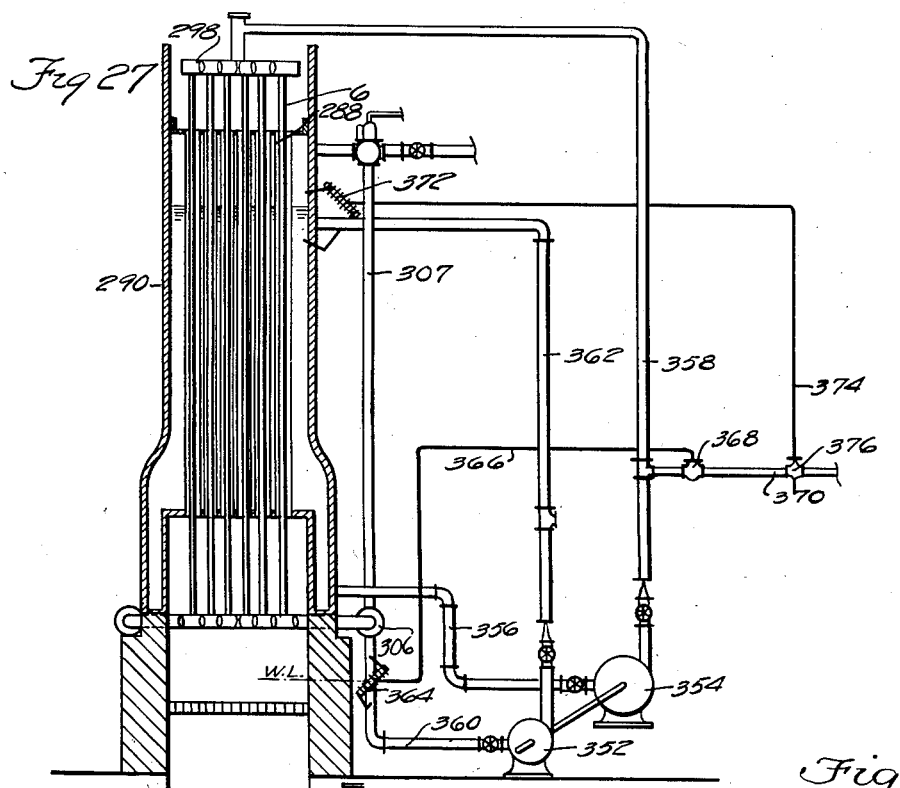
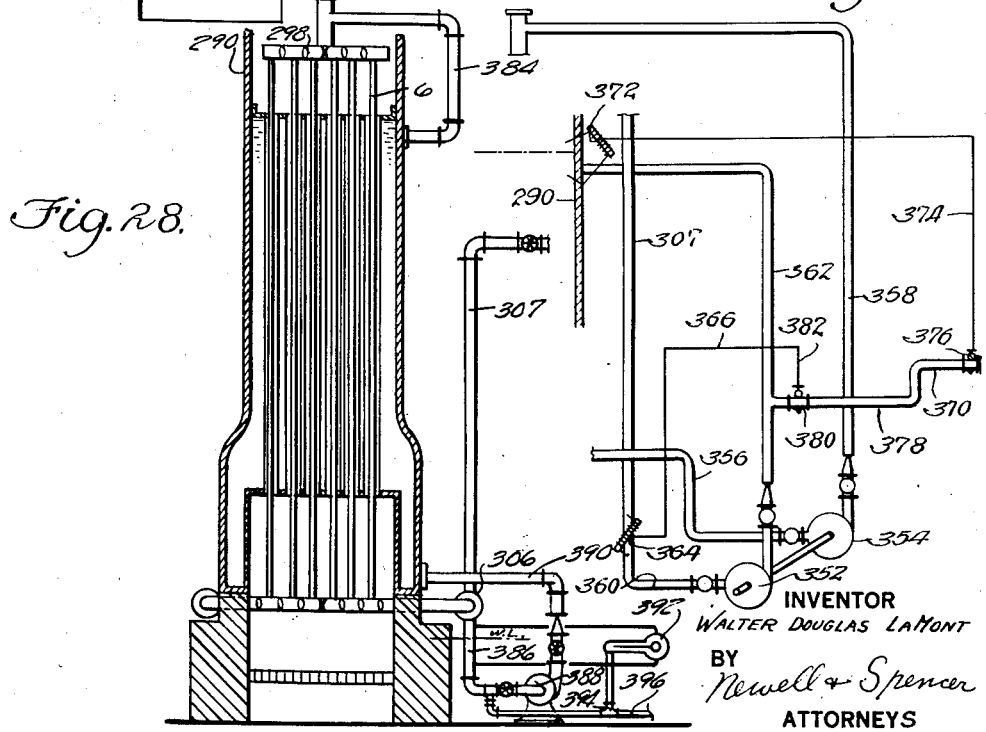

July 21, 1931. W. D. LA MONT 1,815,439
STEAM GENERATOR OR THE LIKE
Filed Jan. 4, 1926 11 Sheets-Sheet 11
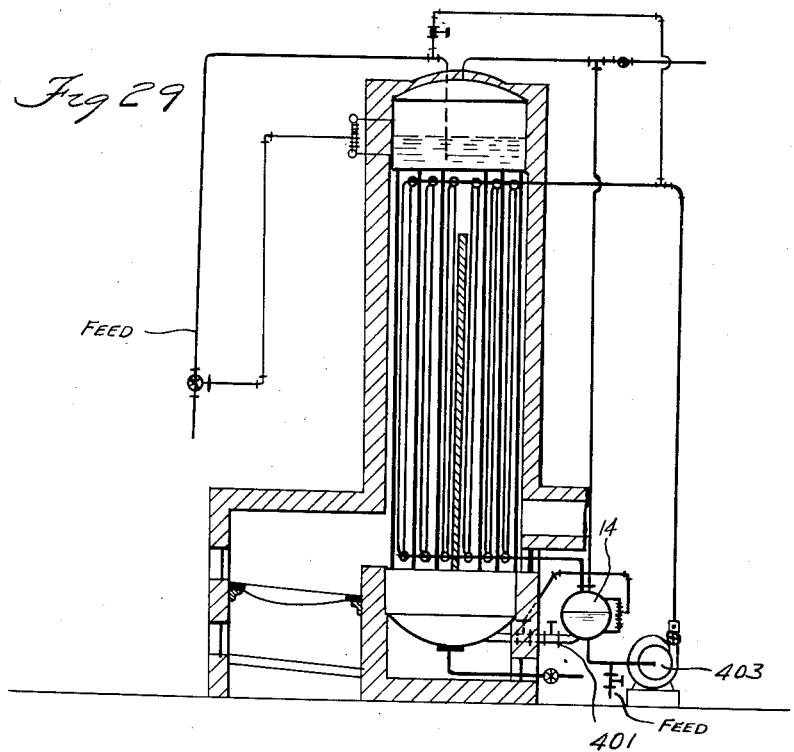
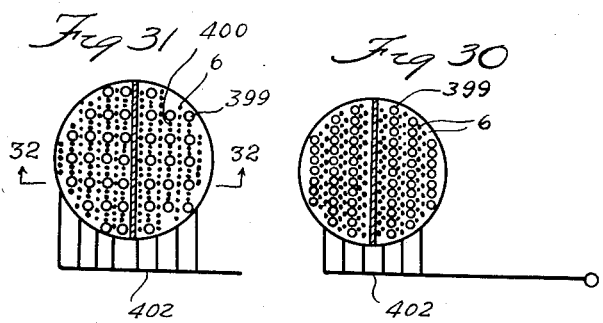
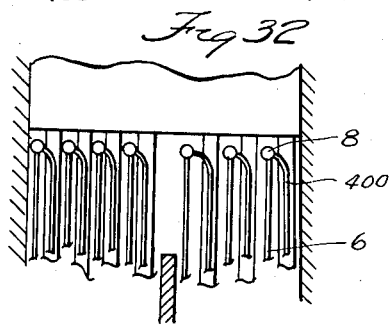
INVENTOR
WALTER DOUGLAS LAMONT
BY
Newell + Spencer
ATTORNEYS

Patented July 21, 1931

1,815,439

UNITED STATES PATENT OFFICE

WALTER DOUGLAS LA MONT, OF NEW ROCHELLE, NEW YORK, ASSIGNOR TO LA MONT CORPORATION, OF NEW YORK, N. Y., A CORPORATION OF NEW YORK

STEAM GENERATOR OR THE LIKE

Application filed January 4, 1926. Serial No. 79,096.

This invention relates to means for effecting a rapid and efficient exchange of heat, particularly between fluids, and is herein illustrated in its application to the generation of steam. It will be understood, however, that the invention is not restricted to the embodiment or uses herein illustrated and described.

In the novel process of generating steam disclosed in my Letters Patent No. 1,545,668, granted July 14, 1925, and also disclosed in my co-pending application Serial No. 32,064, filed May 22, 1925, I insure the rapid exchange of heat between the heating medium or vehicle and the water from which the steam is to be generated by continuously effecting a positive circulation of the water in a predetermined path, which includes steam generating elements in which the water in the form of a gravitating film on one side of the walls of these elements is exposed to heat conducted through these walls from the heating medium or vehicle traveling over the opposite sides of the walls.

In the ordinary types of boilers or steam generators in which steam is generated from water boiled in substantial masses, reliance is had almost entirely upon convection currents for the circulation of the water, with the result that uniformity of heating of the water content of the boiler is rarely obtained. Moreover, frequently portions of the heating surfaces of such boilers are substantially insulated from the water by the generated steam, and in addition, the movement of the generated steam from the heating surfaces through the mass of water sets up eddies and cross currents which prevent that uniformity of direction of the convection currents which is usually necessary to obtain the maximum of heat-exchanging efficiency from the boiler design.

An object of the present invention is not only to aid or to supplement the steam generating action of the ordinary boiler by providing auxiliary means that will utilize some of the heat of the heating medium that has not been utilized in its passage through or over the ordinary boiler, but also so to improve and positively to direct the circulation of the water in the boiler itself as to increase its generating efficiency.

To this end one of the aims of the invention is so to connect to boilers of ordinary construction auxiliary heat-transferring elements employing the principles of heat-exchange disclosed in my patent and in my co-pending application hereinabove identified that they will serve to supplement the action of such boilers, first, by conserving the heat of the heating medium or vehicle in that their more efficient heat-exchanging action takes from the heating medium or vehicle heat units not taken therefrom in the passage of the medium or vehicle through or over the main boiler, and secondly, by so directing the delivery of the boiler water to or its circulation through said elements as to set up a definite and advantageous circulation of the water in the boiler over the heat transfer surfaces of said boiler.

From the foregoing, it will be seen that one of the important objects of the invention is to increase the efficiency of the ordinary boiler as a steam generator by directly increasing the generating action of the boiler itself, whereby the capacity of existing installations may be increased without substantial enlargement.

Another object of the invention is to increase the ultimate efficiency of steam generating outfits as a whole and to reduce stack temperatures by supplementing the heat-exchanging action of the boilers of the older types by a further heat-exchanging action in the auxiliary elements added to the boilers whereby a greater percentage of the total heat units may be taken out of the heated gases or other heat vehicles employed to heat such boilers.

A third object of the invention is so to connect the auxiliary elements to the ordinary boiler as to insure the circulation of the boiler water in a positively defined water circuit including at least a part of the boiler and, preferably, by a pump or other suitable means, set up a positive circulation of the water in said circuit independently of convection action and preferably in such a direction as to obtain a minimum of interferenc from the generated steam and a maximum heat-exchanging effect.

Another object of the invention is so to direct the circulation of the boiler water into definite channels so as to permit effective treatment of the water to remove impurities therefrom.

Other objects and important features of the invention will appear from the following description and claims when considered in connection with the accompanying drawings in which the invention is illustrated as applied to boilers of various standard types.

In the drawings—

Figure 1 illustrates the invention applied to a boiler of the longitudinal drum inclined water tube type;

Fig. 2 shows the invention applied to a cross drum inclined water tube boiler;

Fig. 3 shows the invention applied to a boiler of the Lancashire type;

Fig. 4 shows the invention applied to a boiler of the horizontal return tubular type;

Fig. 5 is a transverse section of Fig. 4 illustrating the arrangement of the pipes for discharging the unvaporized water returned from the auxiliary steam generating elements to the main boiler;

Fig. 6 shows the invention applied to a boiler of the Wickes type with the auxiliary steam generating elements located below the main water level of the main boiler;

Fig. 7 illustrates one manner of using the boiler of Fig. 6 both as a generator and as a superheater by maintaining the water level in the inclined water header at a point below the connection to the header of the uppermost tubes of the generator;

Fig. 8 shows an arrangement by which the upper header of the auxiliary steam generating elements may be positively divided into two chambers so interconnected that the steam generated in the elements connected with one chamber will pass through the generating tubes of the next chamber before going to the steam line, thereby receiving superheat;

Fig. 9 shows the invention applied to a boiler of the Scotch marine type;

Fig. 10 shows the invention applied to a vertical water tube boiler of the Wickes type with the auxiliary steam generating elements above the main water level of the boiler;

Fig. 11 is a detail view showing the location of a baffle in the steam dome at the point where the auxiliary generator discharges its return water into the upper chamber of the main boiler;

Fig. 12 shows the invention applied to a cross drum bent water tube boiler of the Stirling type;

Fig. 13 shows the invention applied to a plurality of boilers of the ordinary type with the auxiliary heat-exchanging or steam generating means located in the flue or stack common to said boilers;

Fig. 14 shows the invention applied to a boiler of the ordinary vertical fire tube type with suggested modifications in the internal construction of the fire tube boiler itself;

Fig. 15 illustrates one construction of means for directing the return water from the auxiliary steam generating mechanism upon the outside of the tubes of the fire tube boiler to form films on said tubes, this figure being a plan view of an arrangement of a main pipe or manifold and lateral jet-discharging pipes;

Fig. 16 is a detail illustrating the way in which the jet pipes of Fig. 15 discharge their jets against the fire tubes;

Fig. 17 is a detail transverse section and

Fig. 18 is a detail vertical section on the line 18—18 of Fig. 17 illustrating an alternative means for directing the return water over the fire tubes to form films thereon;

Fig. 19 is a horizontal section and

Fig. 20 is a vertical section illustrating another modification of means for directing the return water against the outside surfaces of the fire tubes to form films thereon;

Fig. 21 shows the invention applied to a vertical fire tube boiler with the auxiliary heat-exchanging or steam generating elements extending vertically through the fire tubes of the boiler;

Figs. 22 and 23 illustrate arrangements for distributing the water to the upper ends of the auxiliary generating tubes;

Fig. 24 shows the arrangement of the collecting headers at the lower ends of the auxiliary heat-exchanging or steam generating elements in Fig. 21;

Fig. 25 shows the invention applied to a marine boiler of the Thornycroft type;

Fig. 26 is a detail view showing one suitable form of means for directing the film forming jets into the auxiliary heat-exchanging or steam generating tubes;

Fig. 27 shows a modified embodiment of the invention in a fire tube boiler of the type shown in Fig. 21;

Fig. 27a is a view showing parts of Fig. 27 in modified arrangement;

Fig. 28 is a further modified embodiment of the invention in a fire tube boiler of the type shown in Fig. 21;

Fig. 29 is a section through a Wickes type water tube boiler with auxiliary generating tubes placed between the water tubes;

Figs. 30 and 31 are horizontal sections through the tubes showing two different arrangements of auxiliary generating tubes; and Fig. 32 is a vertical section along the line 32—32 of Fig. 31.

As hereinabove pointed out, the invention relates generally to improvements in boilers of the ordinary mass boiling type, whereby not only is the efficiency of such boilers increased but preferably also the action of the boilers is so aided or supplemented as to utilize to greater advantage the heat content of the heating means employed to heat the boilers.

I have herein illustrated and will now describe the application of the invention to various well known types of boilers. It will be understood, however, that the invention is not restricted to application merely to the types of boilers herein illustrated and described, but that it has wide utility in the boiler or steam generator art.

In the various embodiments of the invention herein illustrated, heat-exchanging or steam generating elements of the type disclosed in my Letters Patent No. 1,545,668, dated July 14, 1925, or in my co-pending application No. 32,064, filed May 22, 1925, hereinabove referred to, are so connected to the particular type of boiler to which the invention is to be applied and preferably, also to means for effecting the circulation of the water through said elements, that the circulation thus established effects a positive and beneficial circulation of the water in the main boiler, thus increasing the steam generating efficiency of the boiler itself while at the same time the auxiliary elements are adding to or supplementing the steam-generating action of the boiler. In the embodiments of the invention herein shown, the generating tubes of the auxiliary mechanism are referred to by similar reference characters, and where specific features of the construction of the auxiliary generating tubes and their associated headers are not described, it will be understood that in general these features are similar in construction and mode of operation to those more fully illustrated and described in my co-pending application Serial No. 32,064, hereinabove identified.

In the embodiment of the invention illustrated in Fig. 1 of the drawings which shows the invention applied to a boiler of the longitudinal drum inclined tube type, I have shown the auxiliary steam generating elements as located in the stack 2 connected to the heat chamber 4 of this boiler, these elements comprising the relatively long tubes 6 of small diameter which characterize the steam generators described in my patent and in my co-pending application hereinabove identified. The tubes 6 are connected at their upper ends to headers 8 shown in section, in Fig. 26, which headers in turn are connected to an inclined water manifold 10 to which water is continuously supplied, the lower ends of the tubes being similarly connected to outlet headers 12 in turn connected to a steam separating pot 14. In order that the auxiliary generator thus provided may not only aid or supplement but also accelerate the generating action of the boiler itself, the water supplied to the water manifold 10 is preferably taken from the drum of the boiler, and in the illustrated construction it is taken from the bottom of the drum 16 of the boiler through a pipe 18 connected to a pump 20 which forces the water taken from the drum 16 through a pipe 22 into the water manifold 10.

As in the forms of my invention disclosed in my patent and in my co-pending application hereinabove referred to, the pump 20 preferably continuously supplies the water to the manifold 10 in such quantity that an excess of water over the generating capacity of the tubes is continuously introduced into the generating tubes 6 so that both steam and water are discharged from the lower ends of these tubes into the headers 12 and thence into the steam and water separating pot 14, the excess water collected in the pot 14 being returned through the pipe 24 to the mud drum 26 of the inclined water tube boiler. In the illustrated construction, the mud drum 26 is connected to the header 26a of the boiler, which header is in communication with the inclined tubes 28 of the main boiler and through the pipe 30 or back circulating tube to the drum 16. To accentuate the particular direction of flow of water to the pipe 18 from the drum 16, a baffle 32 may be located in the drum 16 between the outlet from the pipe 18 and the inlet to the pipe 30.

The steam generated in the tubes 6 and separated from the excess water in the pot 14 may be conducted directly into the steam main 34, which receives the steam from the drum 16 of the main boiler, with preferably a safety valve 36 located at the connection between the pot 14 and the main 34, the drum 16 being preferably also provided with a safety valve 38 as shown.

The make-up feed water to replace that converted into steam in the boiler and in the auxiliary tubes 6 may be introduced, as heretofore, into the drum 16 through the feed pipe 40; or, preferably, it may be introduced into the intake of the pump 20 through the feed pipe 42 so that it will be mixed with the hot water from the drum 16 and then carried through the pipe 22 to the manifold 10, and then through the headers 8, tubes 6, headers 12 and pot 14 back to the main boiler, being thus thoroughly heated before introduction into the main boiler.

The water from the manifold 10 is introduced into the tubes 6 through the headers 8 through jet openings carried by said headers similar to those illustrated in my co-pending application Serial No. 32,064 hereinabove identified, this construction being shown in detail in Fig. 26 of the drawings. These jet openings are of such diameter and are so directed that the water is introduced into the tubes 6 in quantity less than sufficient to fill each tube and is projected against the inner surface of each tube so that it forms a film on the tube wall, the quantity of water introduced into each tube being in most instances preferably in excess of that which will be evaporated in its travel through the tube, so that both steam and water issue from the lower end of each tube.

As shown in Fig. 26 of the drawings, the jet openings 44 are formed in a removable jet manifold 46 similar to that shown in my co-pending application, this manifold being adjustable about the longitudinal axis of the header 8 so as to vary the inclination of the jet opening 44 to the axis of the tube 6. When the desired adjustment has been obtained for directing the jet against the inner surface of the tube 6, the jet manifold 46 may be secured in its adjusted position in the header 8 in any suitable manner, as more fully set forth in my co-pending application.

The circulation in the form of invention shown in Fig. 1 may be designated as a series-parallel circulation. Some of the water after passing through the tubes 6 and into the pot 14 passes through the pipe 24 to the header 26a and thence through the water tubes 28 of the main boiler back to the drum 16. From the drum, it is drawn through the pipe 18 and delivered to the manifold 10 to be once more passed along the tubes 6. Other portions of the water may pass only through the tubes 28 to the drum 16 and thence through the pipe 30 to the header 26a.

There is, however, a constant and relatively rapid circulation of water into contact with both the tubes of the main boiler, and the tubes 6 of the auxiliary generator.

In the form of the invention illustrated in Fig. 2 of the drawings in which the invention is shown as applied to an inclined water tube boiler having a cross drum, a slight variation of the circulation is employed. In this construction the auxiliary steam generating mechanism is arranged in the stack 2, as in the form shown in Fig. 1, the auxiliary generator shown being of the type having a symmetrical arrangement of the tubes 6, this arrangement of tubes being served by water manifold 48 of the V form shown in Fig. 2, and the water and steam being separated in pots 50 meeting at 52 in a V-shaped union, from which the return water is conducted through a pipe 54 directly to the mud drum 56, and header 56a, which has no other connection to the cross drum 58 than that provided through the inclined tubes 60 to the header or drum 62 and back through the substantially horizontal tubes 64. The water taken from the drum 58 to feed the auxiliary generating mechanism or tubes 6 must, on its return from this auxiliary generating mechanism through the pots 50 and pipe 54, pass through the tubes 60 and 64 of the main boiler before again reaching the drum 58.

In this embodiment of the invention, the water for the auxiliary generator is taken from the bottom of the drum 58 through the pipe 66 and preferably passes through a slow point tank 68 before being introduced into the tubes 6, this tank in the illustrated embodiment of the invention being shown as located between the drum 58 and the pump 70, which serves to elevate the water through the pipe 72 up to the water manifold 48. By providing a tank 68 of considerable capacity and by introducing the make-up feed water into this tank as, for example, through the intake 74, I can obtain heating of the feed water before its introduction in the generating tube 6 and at the same time, by the slowing up of the flow of the water, due to the capacity of the tank, I can obtain a considerable settling of the solids which may be contained in the feed water or in the boiler water, which solids may be drawn off or blown down through the blow-off cock 76. The inlet to the pipe 78 connecting the tank 60 to the pump 70 is, as shown, preferably above the bottom of the tank 68 to permit the solids to settle without being drawn off into the pump 70. If it is not desired to obtain the settling and heating advantages from introduction of the feed water into the tank 68, the feed water may be introduced at any other suitable point in the water circulation, as, for example, at 80.

It will be understood that features shown in connection with one type of boiler are usually equally applicable to other types of the same general class of boilers; for example, the tank 68, which provides a slow point in the circulation of the auxiliary generator in the form of the invention shown in Fig. 2, is not necessarily restricted in its application to the particular type of boiler shown in Fig. 2, nor is the invention restricted merely to the employment of a slow point, such as provided by the tank 68, for effecting precipitation of foreign substances in the circulating water. It will be apparent that by providing a definite path of travel for the circulating water through which substantially all of the boiler water will eventually be carried, opportunity is given for treating the water in any desired manner to remove the foreign substances therefrom. This is a particularly advantageous feature of the invention in that it permits a substantially complete treatment of the water of the older, well known types of boilers, an operation not heretofore practically possible. In the manner, scaling both of the auxiliary tubes and of the tubes and sheets of the main boiler is materially reduced or prevented.

Not only does the invention permit the improvement of the water quality with a corresponding reduction of scale in boilers of the ordinary type, but it also results in an improvement in the steam quality, due both to the improvement in the circulation in the boiler itself, and to the possibilities of better heat direction and control whereby steam of the desired superheat or of the desired dryness or saturation may be obtained. Moreover, the rapid steam resulting from the improved circulation and the rapid heat exchange in the auxiliary heat exchanging elements gives the generating system a greater flexibility of operation, whereby it is better equipped to meet varying demands.

In Fig. 3 of the drawings, the invention is shown as applied to the Lancashire type of boiler, and in this embodiment of the invention the auxiliary generator is shown as arranged in the stack to receive the hot gases direct from the rear end of the heat flue or chamber 82 of the boiler, thereby modifying the usual practice of taking the gases alongside and underneath this type of boiler before discharging them to the stack.

As shown in Fig. 3, the water to be supplied to the generating tubes 6 is taken from the front end of the lower part 84 of the boiler through pipe 86 to pump 88 to pipe 90 to water manifold 10, this manifold being of the type shown in Fig. 1. The return water discharged from the lower ends of the tubes 6 enters the pot 14 and is returned through pipe 92 to the rear end of the lower part 84 of the boiler, thereby improving the circulation of the boiler.

It will be noted that the convection circulation will be up at the front of the boiler and that the suction of the pump 88 draws its supply from the lower part 84 of the boiler through pipe 86 to pump 88 to pipe 90 to water manifold 10, this manifold being of the type shown in Fig. 1. The return water discharged from the lower ends of the tubes 6 enters the pot 14 and is returned through pipe 92 to the rear end of the lower part 84 of the boiler, thereby improving the circulation of the boiler, causing a movement of the water from back to front across the bottom of the boiler and thus producing a flow of the heated water from front to back in the upper part 94 of the boiler. The steam from the pot 14 may be carried into the common steam line 96 with which the steam line 98 from the steam space 94 is connected through a pipe 100. Feed water to replace that vaporized in the main boiler and also in the generating tubes 6 may be introduced into the suction of the pump 88 through pipe 101.

In Figs 4 and 5 of the drawings, the invention is shown as applied to the common horizontal return tubular boiler, the auxiliary generator being set directly over the up-take of an individual boiler, as shown in Fig. 4, or, in the event that it is employed with a battery of boilers, it may be set in the stack or in the vertical portion of the breeching at the end of such battery of boilers. In this embodiment of the invention, the water to be supplied to the generating tubes 6 may be taken from the rear end of the boiler 102 through the blow-off connection 104 from whence it goes through pipe 106, pump 108 and pipe 110 to water manifold 10. The water discharged from the lower ends of the generating tubes 6 and collected in the pot 14 may be returned to the boiler 102 through a novel arrangement now to be described. The pot 14 is preferably connected to a pipe 112 through a connecting pipe 114. The pipe 112 extends as shown, substantially throughout the length of the boiler 102 and serves as a manifold for a series of discharge nozzles 116 depending from lateral branches 118 of the pipe 112 or directly from the under side of the pipe 112. These nozzles 116 are preferably so arranged as to discharge the return water directly upon the fire tubes 120 of the boiler. It will thus be seen that the return water is effectively distributed over the heating surfaces of the main boiler and that by reason of the taking of the water for the generating tubes 6 from the lower part of the main boiler, a very effective circulation of the water in the main boiler over the heating tubes 120 is obtained.

If desired, the water level of the water in the main boiler 102 may be carried below the lower ends of the nozzles 116 and also below the fire tubes 120 upon which these nozzles discharge, thus permitting the return water to be discharged in the form of films upon the outsides of the fire tubes, thereby increasing the efficiency of the heat transfer and therefore the rate of evaporation. If this is done it will be desirable to discharge water also upon the exposed sheets of the boiler, as, for example, through lateral nozzles 122 to protect these sheets from the heat and also to utilize their inner surfaces for film evaporation.

Feed water to replace that vaporized may be introduced into the boiler circulation at any desired part of the circulation. In the illustrated embodiment of the invention, the feed pipe 124 is shown as provided with valve controlled connections whereby the feed water may be introduced either into the suction of the pump 108 or through the pipe 126 into the lower or upper part of the main boiler 102, this pipe 126, like the pipe 112, preferably extending into the boiler substantially throughout its length and being provided with lateral branches 128 and discharging its feed water through nozzles 130. Through another valve controlled connection, the feed water may be introduced into the pipe 112 and thus be mixed with the return water from the pot 14 and be discharged with this return water through the nozzles 116 upon the fire tubes 120.

In Fig. 6 of the drawings, the invention is shown as applied to a vertical water tube boiler of the Wickes type, comprising upper and lower drums 132, 134, connected by water tubes 136 arranged in two groups separated by a vertical baffle 138 which causes the circulation of the hot gases from the fire chamber 140 or other suitable source of heat to be up the front set of tubes and down the back set of tubes into the discharge flue 142.

In the illustrated embodiment of the invention, the auxiliary generator is shown as located in the discharge flue 142 and with its water manifold 10 below the level 144 of the water in the upper drum 132 of the main boiler. This permits the water manifold 10 to be supplied with water from the main boiler under gravity head through a pipe 146 connected to the lower part of the drum 132. The return water discharged into the pot 14 from the lower ends of the tubes 6 is carried directly to the pump 148, in the illustrated embodiment of the invention, through the pipe 150 and from the pump is returned through the pipe 152 to the lower drum 134 of the boiler. The principal advantage of the illustrated arrangement is that it does not increase the height of the installation. Another advantage lies in the possibility of greater flexibility of control of the water head in the auxiliary generator tubes.

In the illustrated embodiment of the invention is also shown the possibility of using the auxiliary tubes 6 for superheating the steam generated in the main boiler. For this use it is of course necessary to connect the manifold 10 with the steam zone of the main boiler, this being effected in the illustrated embodiment of the invention through a pipe 154, the pipes 146 and 154 being connected to the manifold 10 through a common pipe 156. By the provision of a valve 146a permitting the shut off of pipe 146, steam from the steam zone in the drum 132 may be introduced into the upper ends of the tubes 6 and discharged into the pot 14 and then through the connecting pipe 158 carried to the main steam line 160, the direct connection between the drum 132 and this steam line being shut off by a suitable valve in the pipe 162. A valve 150a is also preferably provided in the pipe 150 so that the pump 148 is shut off from the pot 14.

It will also be seen that by keeping the valve 146a in pipe 146 open at the same time that the connection with the steam zone in the drum 132 is kept open, a mixture of steam and water may be delivered to the manifold 10, thereby effecting a control of the amount of superheat so that superheated steam will be given off from the pot 14 at any desired temperature. Furthermore as shown in Fig. 8 of the drawings, the manifold 10 may be provided with means such as a valve 164 by which it may be divided into two sections, water being introduced into the lower section through pipes 146 and 156 and steam being introduced into the upper section through pipes 154 and 156b. Another connection 166 may be provided to the upper half of the manifold so that if desired, steam may be taken from the upper portion. In this case, the valve 146b and the valve 158a in pipe 158 may be closed. Water passing through pipe 146 and the lower tubes of the auxiliary generator will be turned into steam and passed up through the upper tubes of the auxiliary generator and out through connection 166. By closing valve 166 and opening the valve 156a, the superheated steam generated in the upper tubes may be sent through the steam space of the Wickes boiler, thus improving the quality of the steam discharged therefrom into the steam line 160. The valve 164 may also be substituted by a water level control. The modification in Fig. 7 utilizes a water level control to vary the feed of water from the pipe 146, steam and water being discharged into the lower part of the header and separated, the steam rising to the top of the header and flowing down through the upper generator tubes while the water flows down through the lower generator tubes.

The feed connection to the water circulation to supply water to replace that vaporized can be left in its usual place, as shown at 168, or, as in some of the other embodiments of the invention, it may be connected to the water circulation either on the discharge or on the suction side of the pump.

In Fig. 9 of the drawings, the invention is shown as applied to a boiler of the Scotch marine type, the auxiliary generator being located in the discharge flue or stack 2 from this boiler and the water to supply the auxiliary generator being taken from the bottom of the drum through the pipe 170 to the pump 172 and from the pump 172 through the pipe 174 to the water manifold 10, the return water being taken from the pot 14 through the pipe 176 which has value controlled branches 178, 180. If the valve in the branch 180 is opened and the valve in the branch 178 is closed, the return water will be discharged into the main boiler below the water level 182. If the valve in the branch 180 is closed and the valve in the branch 178 is also closed, the discharge may be carried slightly above the level 182 through a by-pass 184 from the branch 180 or by opening the valve in the branch 178 the return water may be delivered into the boiler at a still higher point. As in the embodiment of the invention already described the steam from the pot 14 is preferably conducted directly to the main steam line 186 to which the main boiler 188 is connected.

Burning out of the auxiliary generator tubes due to failure of the pump feed is prevented by providing steam pipe 395 from the top of the upper header and valves 396 and 397 which are operated by a failure of the pump. This failure may actuate the valves in two ways. When the pump stops, the differential pressure in the pipe 174 and the steam space of the main boiler drops to zero and can be made to operate the differential pressure device 398 which, in turn, operates electrical relays which close valve 397, and open valve 396. All the steam generated then passes up through the auxiliary generator tubes and out through steam pipe 395, thus protecting the auxiliary generator tubes from burning out and discharging superheated steam. The failure of the pump also can operate a governor 394 which actuates the same electrical relays. Other instruments may be substituted for the differential pressure device and the governor where desired. This type of control can be applied to any of the installations illustrated in the drawings in which the auxiliary generator tubes are spaced above the main boiler.

In Figs. 10 and 11, the invention is shown as applied to a vertical water tube boiler of the Wickes type, with the auxiliary generator located above the water level of the main boiler, as distinguished from the embodiment of the invention illustrated in Figs. 6, 7 and 8. In this embodiment of the invention, the water is taken from the lower drum 134 of the boiler through the pipe 190 to the pump 192 or through the by-pass 194 to the auxiliary pump 196, and by one or both of these pumps is raised through the pipe 198 to the manifold 10 of the auxiliary generator. The return water from the collecting and separating pot 14 is carried into the upper drum 132 of the boiler through the pipe 200, being preferably returned to the boiler above the water level 144. To prevent interference with the steam in the drum 132, a baffle 202 may be placed over the discharge opening of the pipe 200 into the drum 132. The feed water may enter through the pipe 168, as in the ordinary boiler of this type, or it may be introduced into any suitable part of the outside circuit, as in some of the other embodiments of the invention.

The lower end of the lower header or pot of the auxiliary generator is connected to the steam drum of the Wickes boiler above the water level. The upper portion of the auxiliary generator pot is connected to the steam line in parallel with the Wickes boiler. This provides for a very flexible operation as when the Wickes boiler is steaming very rapidly while the auxiliary generator is generating but little steam, the steam from the Wickes boiler may flow directly through the steam pipe or partly through the steam pipe and partly through the pot of the auxiliary steam generator. Conversely, when the auxiliary generator is steaming at a very high rate, part of the steam is separated in the pot and is discharged through the upper connection, while part of the steam may be discharged into the steam drum of the Wickes boiler and may pass out through the steam pipe.

In Fig. 12 of the drawings, the invention is shown as applied to a boiler of the cross drum bent water tube type, the illustrated boiler being of the well known Stirling type. The application of the invention to this type of boiler particularly illustrates its utility in increasing the efficiency of the boiler by setting up a more effective circulation of the water therethrough.

In this boiler, the intended circulation of the water, without the connection to the auxiliary generator thereto, is down from the drum 216 through the tubes 212 to the drum 208 and thence up through the front tubes 210 to the drum 214 and back through the water tube 220. The circulation is due to the fact that the water in the front tubes which are exposed to the hottest gases, becomes much hotter and hence lighter than the water in the tubes 212. When steaming begins, the ebullition in the front tubes is very much greater than in the intermediate tubes and tends to carry along the water with it. Feed water from the drum 206 passes down through the rear tubes 204 to the drum 208 where it joins in the main circulation of the water. Drums 214 and 216 are connected by the steam tubes 218 as well as the water tubes 220, any steam separated in the drum 214 being thus conducted to the steam space of the drum 216 from which it is discharged through the steam pipe 222. The drum 206 preferably also has a steam pipe connection 224 with the drum 216 but no water connection except through the tubes 204 and the tubes 210 and 212. By taking the water for the auxiliary generating tubes 6 from the drum 214, as shown, through the pipe 226, pump 228, pipe 230 and the water manifold 10, and by returning the water from the collecting and steam separating pot 14 through the pipe 232 to the drum 206, a positive circulation of the water is set up which greatly increases the efficiency of the steam generating action of the tubes 204, 210 and 212, and thus the auxiliary generator not only supplements the action of the main boiler, but in the operation of its water circulating system increases the efficiency of the main boiler itself by setting up a more positive and effective circulation of the water in the main boiler.

The feed water may be introduced into the boiler at the usual point through the pipe 234, or, if desired, it may be introduced into the outside circulation as, for example, at the suction side of the pump 228 through the feed pipe 236.

In Fig. 13 of the drawings, the invention is shown as applied to a battery of boilers of ordinary type, the auxiliary generator being located in the flue or stack or breeching from the battery of boilers so as to make use of the waste heat not taken up by these boilers in the passage of the gases therethrough or thereover. In this embodiment of the invention the water for the auxiliary generating tubes 6 is carried into a common pump intake pipe 238 from the lower part of each of the battery of boilers and is elevated by the pump 240 through the pipe 242 to the water manifold 10, the return water from the pot 14 being carried back to the drums 244 of the battery of boilers through a common return pipe 246 having branches 248 to the respective drums. The steam from the pot 14 and the steam from the drums 244 are preferably conducted into a common steam main 250.

In Figs. 14 to 20 inclusive, the invention is shown as applied to a boiler of the vertical fire tube type, the auxiliary generator in this embodiment of the invention being arranged with its tubes at a substantial inclination to the vertical, instead of substantially vertical as in the other embodiments hereinbefore described. In this embodiment of the invention, the construction of the fire tube boiler itself is also modified to a certain extent, provision being made for directing the return water from the auxiliary generator over the upper ends of the fire tubes in the form of films on the outer surfaces of these tubes, the main water level in the boiler being preferably lowered to permit this, whereby the heat-exchanging efficiency of the boiler is increased.

In the embodiment of the invention illustrated in Fig. 14, the auxiliary generator is located in an inclined flue or stack connection 252 from the main boiler 254, and the water for the auxiliary tubes 6 is taken from the lower drum of the boiler 254 through a pipe 256 to the pump 258 by which it is elevated through pipe 260 to the water manifold 10, the return water from the pot 14 being conducted through the pipe 262 into the chamber 264 in the boiler 254, the pipe 262 preferably having inlets into the chamber 264 on opposite sides of the boiler as shown, in order to secure more even distribution of the water over a distributing plate 266, shown particularly in Figs. 17 and 18 of the drawings. The distributing plate 266 has in it openings about the fire tubes 268 of such size and shape that the water passing down through said openings will form films concentric with the fire tubes 268, which films, in gravitating down to the water level 270 of the boiler, will be subjected to the heat conducted through the walls of the fire tubes and rapidly converted into steam, this water being the return water which has already had imparted to it considerable heat from the tubes 6 of the auxiliary generator.

In Figs. 15 and 16 are shown modified means for securing distribution of the return water over the fire tubes 268. In this modification, the return pipe 265 is extended into the boiler and is provided with lateral branches 272 provided with jet openings 274 so located as to direct the jets 276 of water against the adjacent fire tubes 268.

As in the hereinbefore described constructions, the steam from the pot 14 is preferably conducted through a pipe 282 directly into a common steam main 284, which also receives the steam from the chamber 264 through the pipe 286.

In Figs. 21 to 24 inclusive is shown another way of applying the invention to a vertical fire tube boiler. In this embodiment of the invention the auxiliary generating elements, instead of being located in the flue or stack to receive the heat from gases that have first passed through the fire tubes of the boiler, are preferably located within the fire tubes themselves, there being preferably an auxiliary generating tube extending up through each fire tube. This arrangement of the auxiliary generating tubes requires quite a different arrangement of the headers for these tubes from that employed with the other embodiments of the invention hereinbefore described, and in Figs. 22, 23 and 24 are illustrated various header and manifold arrangements.

In the embodiment of the invention shown in Fig. 21, the small tubes 6 of the auxiliary generator extend through the fire tubes 288 of the fire tube boiler 290. To give a suitable extension to these tubes, which are of the usual small diameter of the film tubes employed in this type of generator, the tubes 6 preferably extend beyond both ends of the fire tubes 288, thereby providing for contact with the hot gases of the heating medium throughout a considerably greater portion of the travel of these gases than is possible with the fire tubes themselves.

It will be obvious that several advantages are obtained by the location of the tubes 6 of the auxiliary generator within the fire tubes 288 of the main boiler: In the first place, the narrowing of the gas passages increases the velocity and consequently the turbulent action of the gases with a corresponding larger number of contacts of the gas particles with the heating surfaces, and consequently greater rate of heat transfer than is possible in the ordinary fire tube boiler. Moreover, a much greater heat transferring or conducting surface is presented to the gases in the hottest part of their path of travel, thus not only effecting a removal of a greater portion of the heat of the gases in their travel through the fire tubes, but also by reason of the extension of the auxiliary tubes beyond both ends of the fire tubes, insuring that a still further portion of the heat will be taken from the gases by the said auxiliary tubes. Moreover, by reason of the fact that the water in the tubes 6 travels down these tubes in the form of films on the inner surfaces thereof and that there is no interference with the movement of this water by gravity, the heat transfer to the water in these auxiliary tubes 6 will be much greater in proportion to the exposed surface than the heat transfer to the water surrounding the fire tubes 288.

In the embodiment of the invention shown in Fig. 21, as in the other embodiments of the invention hereinabove illustrated, advantage is taken of the positive water movement essential to maintaining a supply of water to the film tubes 6 to insure an advantageous and definite circulation of the water in the main boiler. Provision is preferably made for taking the water, which is to be delivered to the tubes 6, from the main boiler 290. In the illustrated embodiment of the invention, the pump 294, which operates to elevate the water to supply the tubes 6 through the pipe 296 to the upper header or water distributing manifold 298, is connected to the lower part of the main boiler 290 through the pipe 292. The header or manifold 298 comprises radiating arms or branches 300 from a central standpipe 302, these arms or branches receiving the upper ends of the tubes 6 and being provided with suitable means for directing jets of water into the upper ends of the tubes 6 against the inner walls of the tubes to form films thereon in the manner hereinbefore described.

Preferably more water is delivered to the tubes 6 than will be evaporated in its travel therethrough and the excess water and steam which are discharged from the lower ends of the tubes 6 are received in a manifold which may be of the construction shown in Fig. 24 in which the arms or branches 304 are arranged on the radii of a surrounding bustle pipe 306 which serves as a water collecting and steam separating pot. The steam from the bustle pipe 306 is conducted up through the pipe 307 to the main steam line 309, which is also connected to the steam zone 311 of the boiler 290. The water separated from the steam in the bustle pipe 306 passes down through the pipe 313 which connects with the pump 294. In Fig. 21 of the drawings, the pipes 292 and 313 are shown as being connected by a T 315 between the boiler 290 and the pump 294.

In view of the fact that the bustle pipe 306 is below the level of the water in the boiler 290, it is important that there be a suitable water level control by which the amount of water taken into the suction of the pump 294 from the boiler 290 may be governed so that an excess of water will not accumulate in the bustle pipe 306. In the illustrated embodiment of the invention, the water level is preferably maintained below the bustle pipe 306 in the pipe 313 and a suitable governor or water level regulator 317 is provided at this point to control the operation of a valve 319 in the pipe 292 by which the supply of water to the pump 294 from the boiler 290 may be regulated.

It will be seen that this water level control has the further function of supplying water to the pump 294 to feed the film tubes 6. Thus, if the water level in the pipe 313 falls below a predetermined point an increase in the amount of water supplied to the pump through the pipe 292 would be obtained by the automatic opening of the valve 319.

In addition to maintaining a predetermined water level below the bustle pipe 306, it is important also to maintain a predetermined water level in the main boiler 290. The feed water to make up for that converted into steam may be introduced into the boiler 290 directly or it may be mixed with hot water received from the bustle pipe 306. In the embodiment of the invention illustrated in Fig. 21, a water level control 321 connected to the boiler 290 is shown as governing a valve 323 in the feed water pipe 325. This pipe has two valve controlled branches, one of which, 327, is connected to the pipe 292 between the valve 319 and the T 315. The other branch 329 is connected to a pipe 331 extending between the pipe 296 and the boiler 290. By an arrangement of valves A, B and C, respectively in the pipes 329, 331 and 327, the feed water may be introduced at various points in the steam generating apparatus. If the valves B and C be closed, the water level control 321 will cause the make-up feed water to be introduced directly into the boiler 290 from the feed main 325 and the tubes 6 will be supplied only from water which has passed through the boiler 290.

If the valve A be closed and the valves B and C both be opened, the feed water from the pipe 325 will be introduced into the suction of the pump 294 and the feed water to the main boiler will then be received through the valve B and the pipe 331 from the pipe 296. If the valve C be closed and the valves A and B be opened, feed water may be introduced directly to the boiler 290 and also to the tubes 6 through the pipe 296.

It will be seen that the water level control 317 and 321 serve to maintain a predetermined water level in the boiler 290 and also a predetermined water level below the collecting ring or bustle pipe 306, the purpose of maintaining this latter level being to insure gravitation of the water not only through the film tubes 6 but also through the arms or branches 304 of the bustle pipe 306 to insure proper separation of the steam and water at those points. It will be understood, however, that the invention is not restricted to the specific location of the control valves, it being understood that the valve 323 might be located at other points, for example in proximity to the main boiler and that various other combinations of control valves could be made to suit the particular conditions to be maintained.

In Fig. 23 of the drawings is illustrated another arrangement of the upper headers, in which these headers 308 extend laterally from a horizontal manifold 310.

To secure the desired combustion space in the heat chamber 312 into which the auxiliary tubes 6 and their lower manifolds have been extended, it may be desirable to lower the grates from the position in which they are located when the boiler is used without the auxiliary generating mechanism.

In Fig. 25 of the drawings the invention is shown as applied to a marine boiler of the Thornycroft type. In this type of boiler the water tubes 324 extending between the upper drum 326 and the lower drum 328 constitute a water wall for the heat chamber 330, the two drums also having direct connection through a pipe or pipes 332 to insure a supply of water to the tubes 324. There is also preferably provided in this type of boiler a series of connecting tubes 334 between the upper drum and headers 335 constituting outside water walls and from one or more of these the water for the auxiliary generator may be taken, as, for example, through the pipe 336 to the pump 338 by which it is elevated through the pipe 340 to the V-type water manifold 48, from which it is delivered to headers 8 supplying the generating tubes 6. The water for the pump may be taken if desired direct from the drum 326.

In this embodiment of the invention, the auxiliary generator is shown as located above the main boiler in a vertical extension of the heat chamber or in the stack, so that it receives its heat from the gases after they have passed over the generating tubes of the main boiler. The pots 14 are preferably connected directly to the drum 326 to discharge the return water into said drum, baffles 342 being preferably provided so that the discharge of the return water will not interfere with the steam going out of the drum 326 through the pipe 344 to the steam main 346 with which the pots 14 are also connected.

The make-up feed water may be introduced either into the suction of the pump as, for example, through the pipe 348, or as ordinarily in this type of boiler, through the pipe 350 into the drum 326. From the foregoing description it will be seen that the application of the invention to this type of boiler increases the circulation between the drums 326 and 328 of the boiler, thus increasing the generating efficiency of the boiler itself as well as aiding or supplementing this through the auxiliary heat-exchanging elements.

In Figs. 27 and 28 I have shown modifications of the form of the invention illustrated in Fig. 21, in which the tubes 6 are located within the fire tubes of the fire tube boiler 290. In the form of the invention shown in Fig. 27, two circulating pumps 352 and 354 are provided and the water is circulated in series through the tubes 6 and through the boiler 290, the water to supply the tubes 6 being taken from the boiler 290 through pipe 356 and elevated by the pump 354 through the pipe 358 to the header 298, and the water collected in the bustle pipe or collecting ring 306 being delivered through the pipe 360 to the pump 352 and elevated by this pump through the pipe 362 to the boiler 290.

In the form of the invention shown in Fig. 27, a single water level control 364 will ordinarily suffice to maintain the proper amount of water in the system to supply both the tubes 6 and the boiler 290. This control serves to maintain a predetermined water level in the pipe 360, supplying the suction of the pump 352, and it operates, through a suitable connection 366 to the valve 368 in the feed pipe 370, to introduce make-up feed water into the pipe 358 leading to the manifold 298 that supplies the tubes 6, this quantity being sufficient to replace that evaporated in the tubes 6.

However, to prevent the introduction of excess water into the main boiler 290 there is preferably also provided a water level control 372 arranged to maintain a predetermined water level in the main boiler 290, this control being connected by a suitable connection 374 to a valve 376 in the feed pipe 370, the valve 376 being located beyond the valve 368, in order to prevent feed water from entering the valve 368 in the event that the level in the boiler 290 becomes too high. This will result in the pump 354 taking more water from the boiler through the pipe 356 to supply the tubes 6 than would be the case if feed water were introduced by the action of the control 364 through the valve 368 into the pipe 358.

An alternate arrangement shown in Fig. 27a comprises a branch pipe 378 between the pipe 370 and the pipe 362, in which a control valve 380 may be located, governed by connection 382 to the water level control 364, permitting introduction of feed water simultaneously into the pipes 358 and 362. By omitting the connection from 370 to the pipe 358, the feed water may be introduced into the boiler 290 instead of into the generating tubes 6.

In Fig. 28, generation of steam is effected entirely in the tubes 6 the boiler 290 being used as a means for heating the water preparatory to its introduction into the tubes 6. In this embodiment of the invention, the upper end of the boiler 290 is directly connected through a pipe 384 with the header or manifold 298, and the return water from the lower ends of the tubes 6, collected in the bustle pipe 306, is conducted through the pipe 386 to the pump 388 and returned by the pump 388 through the pipe 390 to the lower end of the boiler 290. A water level control 392 governed by the water level in the pipe 386 operates a valve 394 in the feed pipe 396 to introduce water into the suction of the pump 388 to make up for that evaporated into steam and taken off in the steam pipe 307.

It will be obvious that the connections of the pipes 384 and 390 to the boiler 290 may be reversed if desired, so that the pump may introduce the return water and feed water into the upper end of the boiler and the water to supply the tubes 6 may be taken from the lower end of the boiler to take advantage of the principle of counterflow in the boiler 290.

In the installation shown in Fig. 29, auxiliary generator tubes are placed between the water tubes of a Wickes type boiler. Where the water tubes are close together, as shown in Fig. 30, staggered, single trays of tubes 6 may be employed. Where, however, the tubes 399 are spaced widely apart, as shown in Figs. 29, 31 and 32, a double tray of generator tubes is used. In this construction, a straight row of tubes 6 extend straight down from the header 8 and other tubes 400 are bent at an angle so that after the tray is inserted, it can be moved to place the tubes 400 between the water tubes of the main boiler as shown in Fig. 31. The various headers can be supplied with water from the manifold 402 from the pump 403. The circulation through the auxiliary generator tubes may be independent of the circulation in the main boiler by closing the valve 401 in the pipe connecting the lower drum of the Wickes boiler to the pot 14, in which the steam and water from the auxiliary tubes are separated. When, however, valve 401 is opened, water is taken from the main boiler and fed through the auxiliary tubes. This increases the speed of circulation of the water in the main boiler and adds to its efficiency. The close spacing of the auxiliary tubes permits a very compact arrangement which is desirable in many cases where space is at a premium. As the trays can be inserted from the side, it is not necessary to change the design of construction of the Wickes boiler and any tray can be removed without disturbing the tubes or drums of the main boiler. This is an added advantage of the construction shown. When the valve 401 is opened, the illustrated installation also possesses the circulation advantages which were described in connection with Fig. 21.

As hereinabove suggested, the invention permits a material increase in the capacity of existing plants, with a minimum of additional space requirements, at a relatively small cost and with a relatively small increase in the weight of the installation. A very important advantage of the invention is that such increased capacity is largely obtained through an increased efficiency of the entire plant, resulting in a substantially proportionate fuel saving.

Moreover, a study of the illustrated applications of the invention to various well known types of boilers will disclose the simplicity of the application of the invention to existing installations and the relatively minor changes to be made in such installations to permit the embodiment of the invention therein.

As hereinabove suggested, different combinations of features have been shown in the different embodiments of the invention illustrated in the drawings, but it will be understood that the invention is not restricted to any particular combination of features illustrated, nor are features shown in one figure of the drawings necessarily peculiarly applicable to the type of boiler therein illustrated, it being usually possible to make various combinations of the various features illustrated in the different figures of the drawings to obtain the particular results desired. For example, the water taken from the main boiler to supply the auxiliary heat exchanging elements may be taken from various parts of the main boiler, according to the particular purpose in view, and the unvaporized water returned from the auxiliary elements may likewise be returned to various parts of the main boiler, the auxiliary circulation being not necessarily from or to the particular parts of the particular types of boilers illustrated in the various figures. Moreover, the particular location of the auxiliary elements with respect to the main boiler shown in the various illustrations of the application of the invention to different types of boilers is not necessarily the only location or even the preferred location for the solution of a particular plant expansion problem, and it will be understood that such locations shown in the drawings are merely illustrative and that other locations may be made, within the scope of the invention, to meet particular conditions.

From the foregoing description, it will be seen that the invention provides for a substantial lowering of stack temperatures in existing installations; for a substantial expansion of existing installations in a minimum of space, with a minimum of increased weight and with a minimum of expense; for a marked increase in efficiency of existing installations, as well as an increase in capacity; for an improved quality of water, with resultant diminution of scaling; for deaeration of the water through its circulation through the auxiliary elements; for an improvement in the quality of the steam; and, by reason of the flexibility in the relative arrangement of its parts, the invention is susceptible of the widest application to existing installations and to meet any conditions peculiar to such installations.

In the drawings, various combinations of auxiliary generating tubes with main boilers have been shown, together with various accessories and methods of circulating water. The drawings are merely illustrations of a number of applications embodying the improvements of the present invention and have been so chosen as to illustrate as large a number of modifications as possible. It should be understood that the invention is not limited to the particular arrangements shown in the drawings nor is it intended to be limited to the arrangement and number of auxiliary features shown in any particular figure. On the contrary, the installations may be made within the scope of the present invention including any of the features described or their equivalents in combination with any boiler and auxiliary steam generator arrangements and various combinations of a plurality of the novel features shown may be desirable in some installations and are intended to be included within the scope of the present invention.

In addition to the advantages of increased circulation and improved quality of water in both main and auxiliary boilers, the present invention also increases the efficiency of both main and auxiliary boilers due to the fact that in many of the illustrated installations, feed water taken from the main boiler and passed through the auxiliary generator tubes is at a lower temperature than that of the saturated steam so that the first portions of the auxiliary generator tubes may be considered as an economizer or feed water heater and makes it possible to still further lower the stack temperature.

In Figure 7 a common form of control has been diagrammatically illustrated but it should be understood that the invention is not limited to the use of this particular type of control and any other known type of water level control may be substituted. In some cases, some of the water level controls may be omitted and in other cases it may be desirable to incorporate additional controls. This will be largely determined by the exigencies of the particular installation and the omission or addition of further controls will be clear to those skilled in the art when confronted with the operating conditions of particular installations. The invention is not limited to the precise arrangement of controls illustrated in the drawings.

What is claimed as new is—

1. In steam generating apparatus, the combination with a boiler of the mass-boiling type and boiler heating means, of auxiliary steam generating tubes exposed to the heat of said heating means and connected at their respective ends to said boiler to form therewith an auxiliary water circuit, said tubes being arranged for gravitation of the water therethrough, means for positively effecting a circulation of boiler water through said auxiliary circuit and means for so restricting the input of water to the respective elements with relation to the total amount of water supplied to the elements as to properly apportion it to each element and through which restricting means the water is positively forced under action of the pressure generator.

2. In a steam generator, a heat chamber, water tubes normally filled with water to a predetermined level and exposed to the heat at the hottest end of said heat chamber, other water tubes constructed and arranged for gravitation of the water therethrough in the form of an adherent film only partially filling the cross-sectional area of said tubes and located in a less heated part of said chamber, connections between said first mentioned tubes and the upper ends of said last mentioned tubes whereby hot water from said first mentioned tubes is delivered to the last mentioned tubes, and other connections between said two sets of tubes whereby the unvaporized water issuing from the second mentioned set of tubes is returned to the first mentioned set of tubes.

3. In a steam generator, a heat chamber, water tubes normally filled with water to a predetermined level and exposed to the heat at the hottest end of said heat chamber, other water tubes constructed and arranged for gravitation of the water therethrough in the form of an adherent film only partially filling the cross-sectional area of said tubes and located in a less heated part of said chamber, connections between said first mentioned tubes and the upper ends of said last mentioned tubes whereby hot water from said first mentioned tubes is delivered to the last mentioned tubes, other connections between said two sets of tubes whereby the unvaporized water issuing from the second mentioned set of tubes is returned to the first mentioned set of tubes, and means for maintaining a continuous flow of water from said first mentioned tubes to said second mentioned tubes.

4. In a steam generating system, the combination with a mass boiler having a steam and water separating space, of an auxiliary generator associated therewith, said auxiliary generator having steam generating elements forming part of a positively defined water circuit, which circuit also includes at least a portion of the mass boiler, a pressure generator for inducing flow of water in the circuit and means for so restricting the input of water to the respective elements with relation to the total amount of water supplied to the elements as to properly apportion it to each element and through which restricting means the water is positively forced under action of the pressure generator.

5. A steam generating system according to claim 4, in which the heat exchange elements of the auxiliary generator are in the form of tubes to which water is supplied in quantity less than sufficient to fill the tubes in its flow therethrough in order to form a film on the tube wall.

6. A steam generating system according to claim 4, in which the restrictions put upon the input to the respective elements is so adjusted to the water head at the input end that each element is supplied with water in quantity less than sufficient to occupy all of the cross-sectional area of any element throughout its length but greater than the evaporating capacity of the element.

7. A steam generating system according to claim 4, in which the heat exchange elements of the auxiliary generator are in the form of tubes to which water is supplied in quantity less than sufficient to fill the tubes in its flow therethrough in order to form a film on the tube wall, and in which the auxiliary generator is exposed to the waste heat from the mass boiler.

8. A steam generating system according to claim 4, in which means for treating the water for precipitation or removal of foreign substances as it passes through the circuit is inserted in the circuit.

9. A steam generating apparatus comprising in combination a generator of the mass boiling type having tubes arranged for uni-directional flow therein and a tubular auxiliary generator, connections between said generators whereby water to supply the tubes of the second generator is received from the tubes of the first generator and any excess water from the tubes of the second generator is returned to the first generator, and means including a pump in said connections to insure uni-directional circulation of water through said generators and connections as a unit.

10. In a steam generator, a heat chamber, water tubes normally filled with water to a predetermined level and exposed to the heat at the hottest end of said heat chamber, other water tubes constructed and arranged for gravitation of the water therethrough in quantity only partially filling the cross-sectional area of said tubes and located in a less heated part of said chamber, connections between said first mentioned tubes and the upper ends of said last mentioned tubes whereby water from said first mentioned tubes is delivered to the last mentioned tubes, and other connections between said two sets of tubes whereby the unvaporized water issuing from the second mentioned set of tubes is returned to the first mentioned set of tubes.

11. A steam generating system comprising a mass boiler having a storage space for a large quantity of water, an auxiliary generator which has a plurality of steam generating tubes to which water is delivered, means including a header connecting the inlet ends of said tubes which so controls the input of water to each tube with relation to the total amount of water supplied to the tubes as to properly apportion the water to each tube and cause it to flow uni-directionally therein and positively acting means for withdrawing water from said storage space and introducing it into the header under a pressure head required to supply each tube with water sufficient for its steam generating capacity.

12. Steam generating system comprising a mass boiler having a steam and water separating space, an auxiliary generator which has a plurality of steam generating tubes to which water is delivered, a header connecting the inlet ends of said tubes, a second header connecting the outlet ends of the tubes, a conduit connecting the mass boiler with the inlet header for conducting water to the latter, a conduit connecting the outlet header with the mass boiler, a pump for positively circulating the water through the system and introducing it under pressure to said inlet header and means for so controlling the input of water to each tube with relation to the total amount of water supplied to all of the tubes as to properly apportion the water to each tube and supply it with water in excess of its steam generating capacity, said system being so arranged that the excess water and the steam discharged from said tubes are separated in the mass boiler.

13. A steam generating system comprising a passageway for heating gases, a main boiler located in said passageway and having a water containing space, an auxiliary generator in said passageway which is in circuit with said boiler and has steam generating tubes, means for positively forcing water to said tubes from the water space of the main boiler, means for so restricting the input of water to each tube as to properly apportion it to said tubes, and means for returning to the boiler any excess water discharged from the tubes, said passageway and tubes being so arranged as to cause the heating gases to flow along the tubes in a direction opposite to that in which the steam and water flow therein.

14. A steam generating system of the type covered by claim 13 which comprises means for introducing feed water into the circuit at such a point that it will pass through the tubes before it goes to the mass boiler.

Signed at New York, N. Y., this 2nd day of January, 1926.

WALTER DOUGLAS LA MONT.